United States Patent
De Santis et al.

(10) Patent No.: US 12,063,313 B2
(45) Date of Patent: Aug. 13, 2024

(54) SIGNING SYSTEM FOR VALIDATING STATEFUL HASH-BASED DIGITAL SIGNATURES

(71) Applicant: Siemens Aktiengesellschaft, Munich (DE)

(72) Inventors: Fabrizio De Santis, Munich (DE); Antonio Vaira, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/283,145

(22) PCT Filed: Mar. 9, 2022

(86) PCT No.: PCT/EP2022/056063
§ 371 (c)(1),
(2) Date: Sep. 20, 2023

(87) PCT Pub. No.: WO2022/207263
PCT Pub. Date: Oct. 6, 2022

(65) Prior Publication Data
US 2024/0039734 A1    Feb. 1, 2024

(30) Foreign Application Priority Data
Mar. 31, 2021   (EP) ..................... 21166401

(51) Int. Cl.
*H04L 9/40*   (2022.01)
*H04L 9/32*   (2006.01)
(52) U.S. Cl.
CPC ................... *H04L 9/3247* (2013.01)
(58) Field of Classification Search
CPC .................................................... H04L 9/3247
See application file for complete search history.

(56) References Cited

U.S. PATENT DOCUMENTS

| | | | |
|---|---|---|---|
| 5,016,274 A * | 5/1991 | Micali | G06Q 20/341 |
| | | | 713/180 |
| 9,942,034 B2 * | 4/2018 | Le Saint | H04L 9/0825 |

(Continued)

OTHER PUBLICATIONS

Cooper, A David et al: "Recommendation for Stateful Hash-Based Signature Schemes NIST SP 800-208"; NIST, National Institute of Standards and Technology (NIST); Oct. 28, 2020 (Oct. 28, 2020), pp. 1-59, XP061057777.

(Continued)

*Primary Examiner* — Ghodrat Jamshidi
(74) *Attorney, Agent, or Firm* — Schmeiser, Olsen & Watts LLP

(57) ABSTRACT

A signing system for validating stateful hash-based digital signatures includes a signing device, a logging device and a verifying device, wherein each signing device is configured to receive data, generate a hash-based digital signature including a one-time signature, generate a one-time public key, send the generated one-time public key, send the hash-based digital signature, the verifying device is configured to generate a validation one-time public key, send the validation one-time public key, and the logging device is configured to store the generated one-time public key, receive a validation one-time public key, compare the validation one-time public key with all one-time public keys, provide a validation feedback signal, if the validation one-time public key coincides with exactly one stored one-time private key, and provide a warning feedback signal, if the validation one-time public key does not coincide with exactly one stored one-time private key.

14 Claims, 4 Drawing Sheets

(56) References Cited

U.S. PATENT DOCUMENTS

Figure 1:
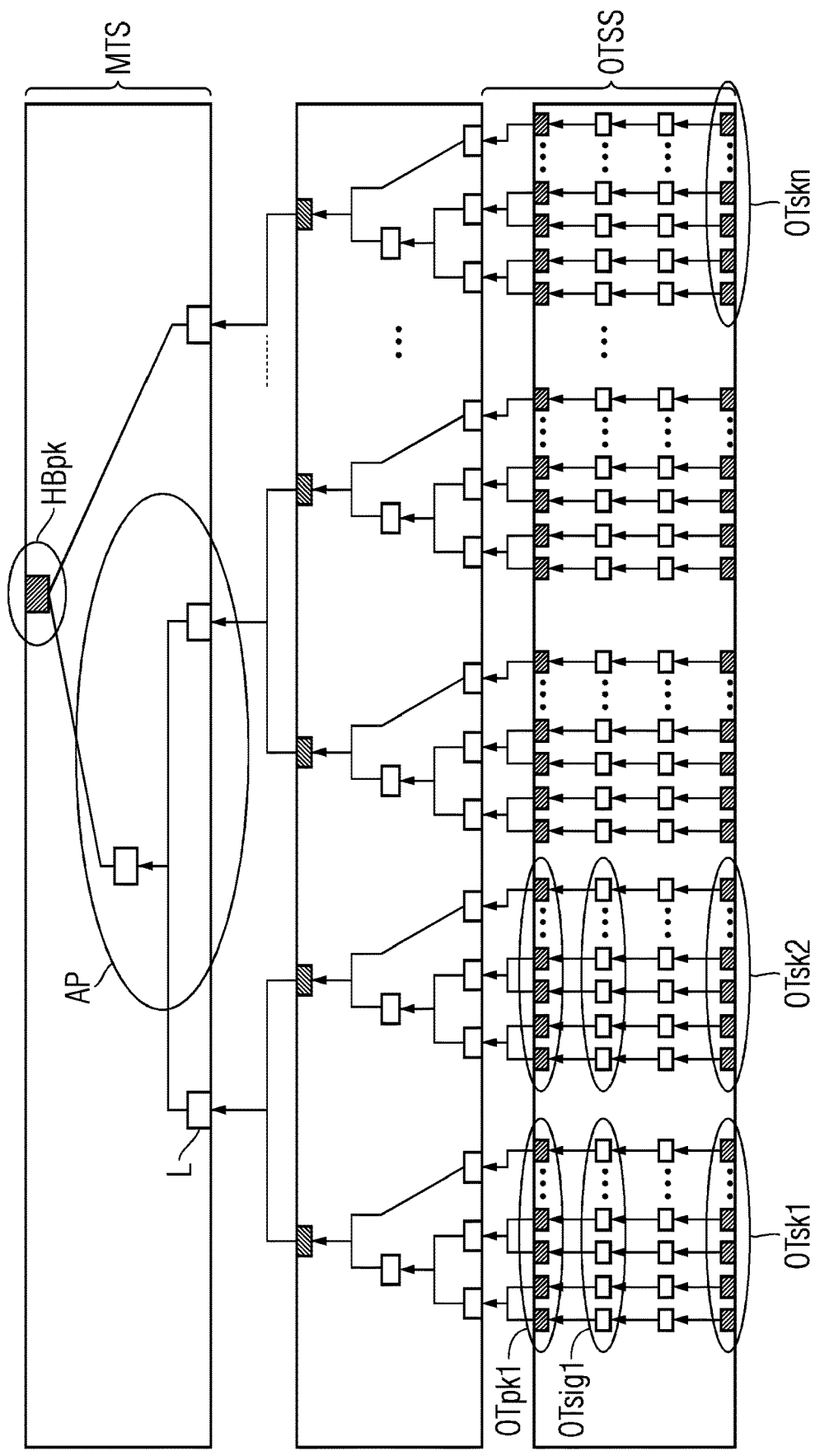

| | | | |
|---|---|---|---|
| 10,148,441 B2* | 12/2018 | Kaliski, Jr. | H04L 9/3247 |
| 10,581,616 B1 | 3/2020 | Paruzel | |
| 2005/0203854 A1* | 9/2005 | Das | G06Q 20/389 |
| | | | 705/64 |
| 2007/0086592 A1* | 4/2007 | Ellison | H04L 63/101 |
| | | | 380/282 |
| 2008/0095360 A1* | 4/2008 | Vuillaume | H04L 9/3236 |
| | | | 713/180 |
| 2011/0066859 A1* | 3/2011 | Iyer | H04W 12/106 |
| | | | 713/181 |
| 2012/0239937 A1* | 9/2012 | Yamanaka | H04L 9/3247 |
| | | | 380/279 |
| 2014/0006615 A1* | 1/2014 | Karnik | H04L 63/1441 |
| | | | 709/225 |
| 2016/0080156 A1 | 3/2016 | Kaliski, Jr. | |
| 2016/0218875 A1* | 7/2016 | Le Saint | H04L 9/0825 |
| 2016/0294826 A1* | 10/2016 | Han | H04W 12/086 |
| 2017/0357496 A1* | 12/2017 | Smith | H04L 9/0662 |
| 2018/0183601 A1* | 6/2018 | Campagna | G06F 21/602 |
| 2019/0319782 A1* | 10/2019 | Ghosh | G06F 7/503 |
| 2019/0319803 A1* | 10/2019 | Misoczki | H04L 9/0852 |
| 2020/0162247 A1* | 5/2020 | Nix | H04L 9/0841 |
| 2020/0228343 A1* | 7/2020 | Yu | H04L 9/3247 |
| 2021/0097185 A1* | 4/2021 | Gilton | G06F 21/54 |
| 2021/0176072 A1* | 6/2021 | Chalkias | H04L 9/3297 |
| 2021/0234857 A1* | 7/2021 | Nakagawa | H04L 9/3236 |

OTHER PUBLICATIONS

Santosh, Ghosh et al: "Lightweight Post-Quantum-Secure Digital Signature Approach for IoT Motes"; IACR, International Association for Cryptologic Research, vol. 20190213:033538, Feb. 7, 2019 (Feb. 7, 2019), pp. 1-23, XP061031800.

Request for Comments; RFC 8391; https://www.rfc-editor.org/pdfrfc/rfc8391.txt.pdf retrieved Mar. 31, 2021.

Buchmann, Johannes et al: "XMSS—A Practical Forward Secure Signature Scheme Based on Minimal Security Assumptions"; Dec. 2, 2011 (Dec. 2, 2011); ICIAP: International Conference On Image Analysis and Processing, 17th International Conference, Naples, Italy, Sep. 9-13, 2013. Proceedings; [Lecture Notes in Computer Science; Lect.Notes Computer], Springer, Berlin, Heidelberg; pp. 117-1; XP047375884.

Request for Comments; RFC 8554; https://www.rfc-editor.org/pdfrfc/rfc8554.txt.pdf retrieved Mar. 31, 2021.

NIST SP 800-28 https://nvlpubs.nist.gov/nistpubs/Legacy/SP/nistspecialpublication800-28.pdf retrieved Mar. 31, 2021.

PCT International Search Report and Written Opinion of International Searching Authority mailed Jun. 30, 2022 corresponding to PCT International Application No. PCT/EP2022/056063 filed Mar. 9, 2022.

* cited by examiner

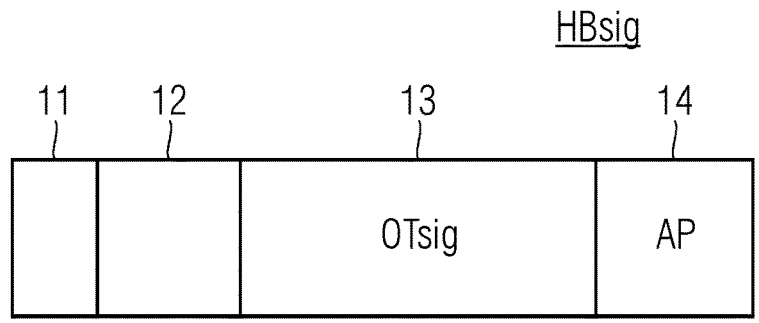
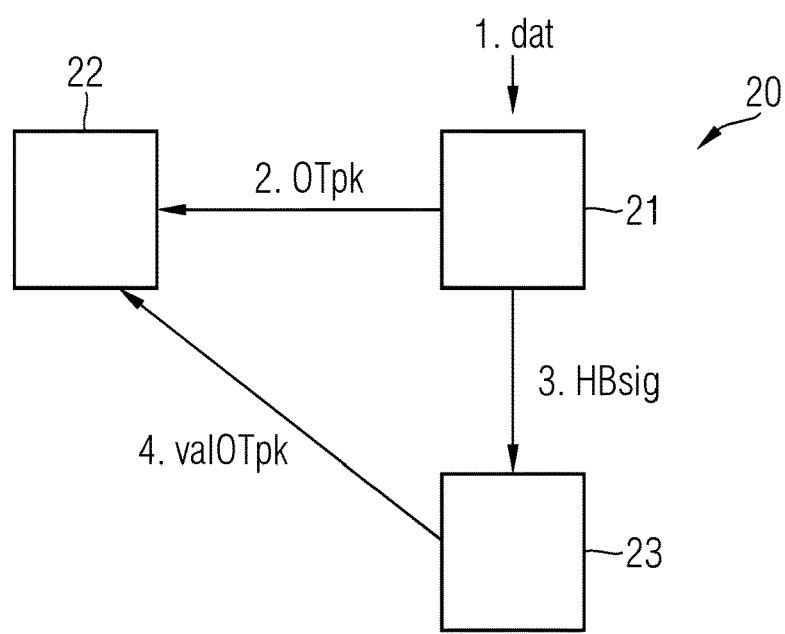
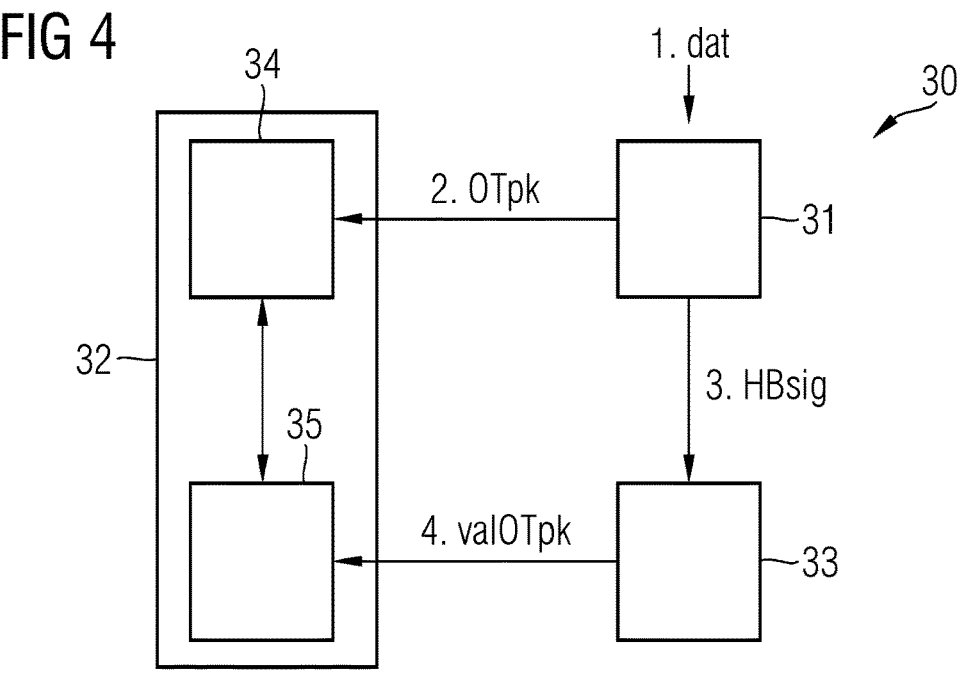

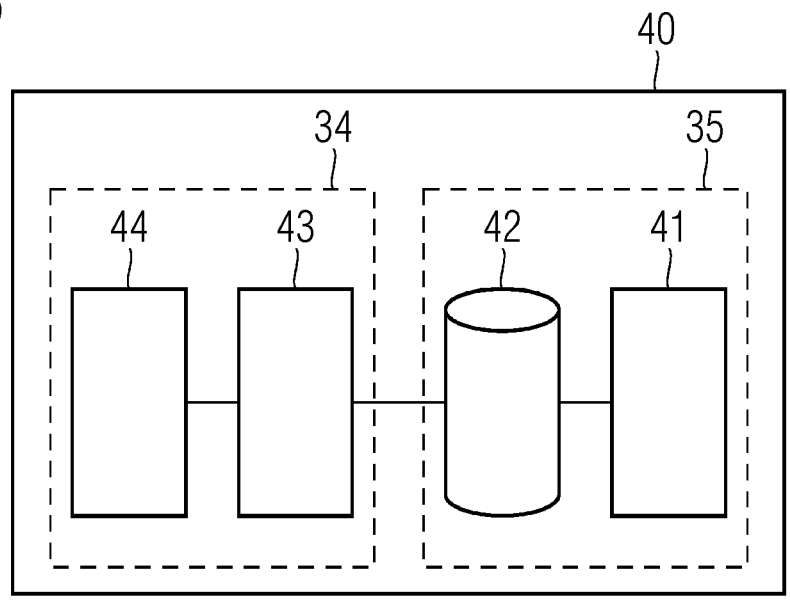
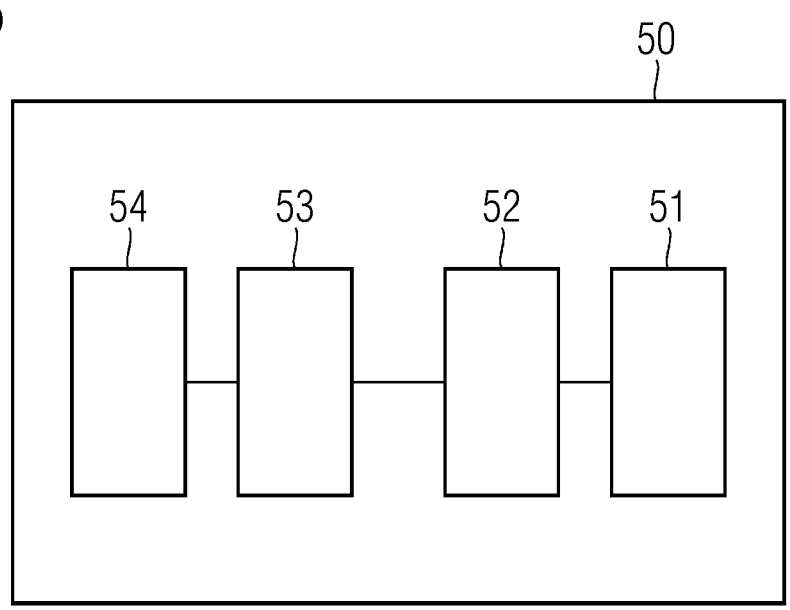

SIGNING SYSTEM FOR VALIDATING STATEFUL HASH-BASED DIGITAL SIGNATURES

CROSS-REFERENCE TO RELATED APPLICATIONS

This application claims priority to PCT Application No. PCT/EP2022/056063, having a filing date of Mar. 9, 2022, which claims priority to EP Application No. 21166401.6, having a filing date of Mar. 31, 2021, the entire contents both of which are hereby incorporated by reference.

FIELD OF TECHNOLOGY

The following relates to a method and monitoring system for monitoring hash-based digital signatures comprising a requesting device, a monitoring apparatus and a stateful hash-based cryptographic device.

BACKGROUND

Nowadays, internet of things (IoT) devices are increasingly applied in private and industrial environments. IoT devices communicate with each other or with controllers in public or private communication networks. Public-key cryptography is used to secure authenticity of communication partners and integrity of the exchanged data. Digital signatures are applied in device certificate to provide counterfeit protection. Therefore, the digital signatures need to provide protection over the whole lifetime of the device, which can extend up to 10 to 20 years in industrial environment. Respectively public-key cryptography schemes are required, which are still secure in 10 or 20 years.

Public-key cryptography refers to cryptosystems which employ key-pairs instead of individual secret keys. A key pair consist of a private key, which is only known to its owner, and a public key, which can be distributed publicly to anybody without compromising the security of the cryptosystem.

Digital signatures are an example of public-key cryptography, in which a message is signed using the sender's private key and can be verified by anyone having access to the corresponding sender's public key. Two widely employed approaches to public-key cryptography are RSA (Rivest-Shamir-Adleman) and elliptic-curve cryptography. These cryptosystems are based on the RSA problem and the elliptic-curve discrete logarithm problem, respectively. So far, no efficient methods are known to solve such problems using current computing technologies. This means that for sufficiently large numbers the task of solving such problems is believed to be impossible with conventional computers. However, efficient quantum algorithms (e.g. Shor's algorithm) are known to solve such problems with the aid of quantum computers. This means that as soon as powerful enough quantum computers will be built in the future, the security of RSA and elliptic-curve cryptographic systems will become at risk of compromise and should be replaced by algorithms which are also resistant against quantum attacks.

Post-quantum cryptography generally refers to a class of public-key cryptographic algorithms for which no efficient quantum and non-quantum algorithms are known to solve the underlying math problems. One way of realizing post-quantum digital signatures is to employ stateful hash-based signatures algorithms whose security is based on the security of hash functions. One example of a stateful hash-based signature algorithm is eXtended Merkle Signature Scheme (XMSS) described in RFC 8391, which builds upon Winterniz One-Time Signatures+(WOTS+) and Merkle trees. Another approach to hash-based signatures is the Leighton-Micali Signature (LMS) scheme described in the RFC 8554, build upon Leighton-Micali One-Time Signatures (LM-OTS).

WOTS+ private keys are generated using a Pseudo-Random Number Generator (PRNG) using a secret seed and an index as state information. In order to ensure the security of XMSS, it must be guaranteed that the index is never used more than once, e.g., each WOTS+ private key is only generated once using the secret seed and the current index, which gets increased with every signature. This can be achieved using a secure monotone counter, which cannot be decreased or reset. This is typically a very strong requirement which can be circumvented, e.g., by modifying the counter after it has been loaded from memory into the system.

Nowadays, the management of the state is handled by an entity generating the stateful hash-based signature, called a signer, which should take care that the keys are not used twice. For the verifier of a stateful hash-based signature, e.g., an IoT device, there is no way to check if the signer is behaving correctly. However, this might not be an adequate solution in some critical use cases such as digital signatures of software/firmware packages, where maliciously signed updates may lead to major consequences.

SUMMARY

Therefore, an aspect relates to providing a solution that enables the user, i.e. the verifier, of a stateful hash-based signature to identify a security breach of a hash-based signature, e.g., a key re-usage attack or a malfunction of the signer.

An aspect concerns a signing system for validating stateful hash-based digital signatures, comprising at least one signing device, a logging device and a verifying device, wherein each signing device is configured to
  receive data to be signed,
  generate a hash-based digital signature comprising a one-time signature calculated for the data based on a one-time private key,
  generate a one-time public key based on the one-time signature,
  send the generated one-time public key to the logging de-vice,
  send the hash-based digital signature to the verifying de-vice, the verifying device is configured to
  generated a validation one-time public key based on the hash-based digital signature and the data,
  send the validation one-time public key to the logging de-vice, and the logging device is configured to
  store the generated one-time public key,
  receive a validation one-time public key,
  compare the validation one-time public key with all one-time public keys stored in the logging device, and
  provide a validation feedback signal to the verifying de-vice, if the validation one-time public key coincides with exactly one stored one-time private key, and
  provide a warning feedback signal, if the validation one-time public key does not coincide with exactly one stored one-time private key to the verifying device.

Embodiments of the invention are based on the main observation that any one-time private key is uniquely tied to its respective one-time public key as they are in a 1:1 relationship. In fact, the one-time public key can be computed from a one-time signature, which is public information included into a stateful hash-based signature, which is public information as well. Therefore, it is sufficient to compare one-time public keys computed from stateful hash-based signatures to check whether the same one-time private key has been used multiple times. A main idea behind embodiments of the invention is to rely on independent logging device, i.e. external auditors and public logs, to verify the correct functioning of hash-based stateful signing devices in the context of stateful hash-based cryptography. In case the signing device fails to use a one-time private key only once, this can be recognized by external auditors, i.e. the logging device. Compared to the known stateful hash-based signing approaches, which are based on self-checking techniques, there is no single point of failure in the disclosed signing system. There is no need to implement expensive checks on the state, e.g. self-checking techniques, monotone counters, and further in the signing device.

In a further embodiment of the signing system, the logging device comprises a logging unit storing the one-time public key and an auditing unit monitoring the stored one-time public keys in the logging unit.

Separating the logging device into a logging unit and an auditing unit has the advantage, that the logging unit can be kept simple in terms of processing capabilities as it only stores the one-time public keys. The logging unit can be secured with stronger security measures than the auditing unit to prevent manipulation of the stored one-time public keys.

In a further embodiment of the signing system, the auditing unit receives the validation one-time public key from the verifying device and provides the validation feedback signal or the warning feedback signal to the verifying device.

By that, the auditing unit provides a single interface to the verifying device and protecting the logging unit from external access.

In a further embodiment of the signing system, on receiving the generated one-time public key from the signing device in the logging unit, the logging unit or the auditing unit compares the generated one-time public key with all one-time public keys previously stored in the logging unit, and provides the validation feedback signal or the warning feedback signal to the auditing unit.

In embodiments the logging device is not triggered by the verifying device, but by the one-time public key received from the signing device. This allows a faster validation on receiving the validation one-time public key from the verifying device as the validation is already performed and the resulting feedback signal only needs to be forwarded to the verifying device.

In a further embodiment of the signing system, on receiving the validation one-time public key from the verifying device, the auditing unit compares the validation one-time public key with the stored one-time public keys and provides the validation feedback signal or the warning feedback signal to the auditing unit.

By validating the received validation on its receipt in the auditing unit, the validation is limited to the received validation one-time public keys and optimizes the required processing capacity for validation.

In a further embodiment of the signing system, the auditing unit stores the validation one-time public key received from the verifying device and, if a warning feedback signal is received for the validation one-time public key at a later time, provides this warning feedback signal automatically to the verifying device which has sent the validation one-time public key.

This enables the auditing unit to keep track of the verifying device requests, such that, in case the one-time public key is used multiples times, the auditing unit can proactively notify the affected verifying device of the unexpected behavior of the signing device.

In a further embodiment of the signing device, the auditing unit notifies all verifying devices, which received a validation feedback signal, if a warning feedback signal is provided for any of the one-time public key stored in the logging device.

This enables all verifying devices which received a hash-based signature from the signing device about the unexpected behaviour of the signing device. All verifying devices can react if any measures are defined for such a situation.

In a further embodiment of the signing system, the auditing unit passes the validation one-time public key received from the verifying device to the logging unit and passes the validation or warning feedback signal received from the logging unit to the verifying device.

In this embodiment the validation, i.e, the comparing and providing functions, are located at the logging unit having direct access to the stored one-time public keys.

In a further embodiment of the signing system, the signing device sends the hash-based digital signature and the data to be signed to the logging device, and the logging device generates the one-time public key based on the hash-based digital signature and the data.

With this embodiment the signing system performs only the signing of the data but merely any additional functionality. In consequence only few adaptions are required compared to a standard procedure performed in the signing device.

In a further embodiment of the signing system, the logging device stores additional meta-information related to the hash-based digital signature received from the signing device and/or the logging device stores additional meta-information related to the verifying device received with the validation one-time public key from the verifying device.

This meta-information can be used to further attest the plausibility of a correct functioning of the signing device, e.g. using machine learning methods. The meta-information on related to the verifying device can be used to further attest the plausibility of a correct functioning of the verifying device, e.g. using machine learning methods. Also, the logging device may generate further meta-information on his own.

In a further embodiment of the signing system, the logging device comprises more than one logging units and/or more than one auditing units.

This has the advantage that logging devices and/or auditing units can be organized in a hierarchical structure and replicate only the information that is relevant in the given context, e.g. geographical region.

A further aspect concerns a logging device comprising at least one logging unit and at least one auditing unit configured to
    store the generated one-time public key,
    receive a validation one-time public key,
    compare the validation one-time public key with all one-time public keys stored in the logging device, and
    provide a validation feedback signal to the verifying device, if the validation one-time public key coincides with exactly one stored one-time private key, and provide a warning feedback signal, if the validation one-time public key does not coincide with exactly one stored one-time private key to the verifying device.

The logging device recognizes failure of the signing device additionally to monitoring of internal state handling in the signing device.

A further aspect concerns a signing device comprising at least one processor configured to
receive data to be signed,
generate a hash-based digital signature comprising a one-time signature calculated for the data based on a one-time private key,
generate a one-time public key based on the one-time signa-ture,
send the generated one-time public key to a logging device,
send the hash-based digital signature to a verifying device.

A further aspect concerns a method for identifying a security breach of stateful hash-based digital signatures, comprising the steps:
in a signing device
receiving data to be signed,
generating a hash-based digital signature comprising a one-time signature calculated for the data based on a one-time private key,
generating a one-time public key based on the one-time signature,
sending the generated one-time public key to a logging device,
sending the hash-based digital signature to a verifying device, and in the verifying device
generating a validation one-time public key based on the hash-based digital signature and the data,
sending the validation one-time public key to the logging device, in the logging device
storing the generated one-time public key,
receiving the validation one-time public key,
comparing the validation one-time public key with all one-time public keys stored in the logging device, and
providing a validation feedback signal to the verifying device, if the validation one-time public key coincides with exactly one stored one-time private key, and
providing a warning feedback signal, if the validation one-time public key does not coincide with exactly one stored one-time private key to the verifying device.

A further aspect concerns a computer program product (non-transitory computer readable storage medium having instructions, which when executed by a processor, perform actions) directly loadable into the internal memory of a digital computer, comprising software code portions for performing the steps as described before, when said product is run on said digital computer.

BRIEF DESCRIPTION

Figure 7:
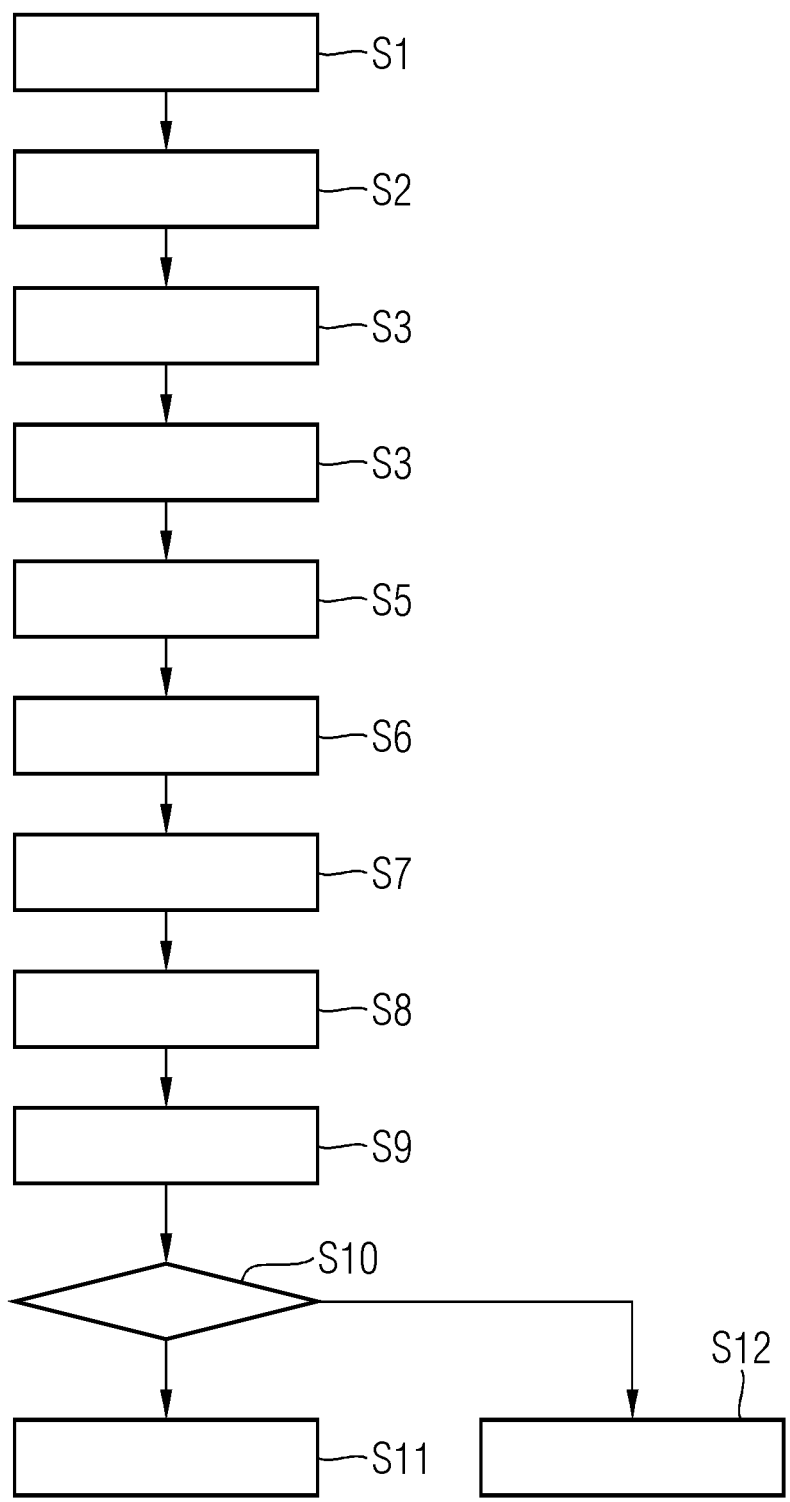

Some of the embodiments will be described in detail, with reference to the following figures, wherein like designations denote like members, wherein:
FIG. 1 schematically illustrates a signature scheme of a stateful hash-based digital cryptography;
FIG. 2 schematically illustrates a structure of a stateful hash-based digital signature;
FIG. 3 schematically illustrates a first embodiment of an inventive signing system;
FIG. 4 schematically illustrates a second embodiment of an inventive signing system having a logging device with separate logging unit and auditing unit;
FIG. 5 schematically illustrates an embodiment of an inventive logging device;
FIG. 6 schematically illustrates an embodiment of an inventive signing device; and
FIG. 7 shows an embodiment of an inventive method illustrated by a flow diagram.

DETAILED DESCRIPTION

It is noted that in the following detailed description of embodiments, the accompanying drawings are only schematic, and the illustrated elements are not necessarily shown to scale. Rather, the drawings are intended to illustrate functions and the co-operation of components. Here, it is to be understood that any connection or coupling of functional blocks, devices, components or other physical or functional elements could also be implemented by an indirect connection or coupling, e.g., via one or more intermediate elements. A connection or a coupling of elements or components or nodes can for example be implemented by a wire-based, a wireless connection and/or by a combination of a wire-based and a wireless connection. Functional units can be implemented by dedicated hardware, e.g., processor, by firmware or by software, and/or by a combination of dedicated hardware and firmware and software. It is further noted that each functional unit described for an apparatus can perform a functional step of the related method.

Stateful hash-based signature and hash-based signatures as well as private key and secret key are used as synonyms throughout this document.

FIG. 1 shows a structure of a stateful hash-based cryptography function, i.e. a stateful hash-based signature scheme. Hash-based signature schemes combine a one-time signature scheme OTSS with a Merkle tree structure MTS. Since a one-time signature scheme key can only sign a single message, i.e., data to be signed, securely, it is practical to combine many such keys within a single, larger structure. A Merkle tree structure MTS is used to this end. In this hierarchical data structure, a hash function and concatenation are used repeatedly to compute tree nodes.

Hash-based signature schemes are stateful, meaning that signing requires updating the private key, unlike conventional digital signature schemes. For stateful hash-based signature schemes, signing requires keeping state of the used one-time keys and making sure they are never reused. In this way a one-time private key OTsk is uniquely used to generate a one-time signature OTsig, the one-time signature OTsig is uniquely tied to a one-time public key OTpk. A hash-based public key HBpk is determined based on all one-time signature scemes and builds the root of the Merkle tree. The hash-based public key HBpk is published to verify all hash-based digital signatures generated based on one of the one-time private keys OTsk.

As an example, according to the eXtended Merkle Signature Scheme XMSS described in the RFC 8391, Winternitz One-Time Signature Plus (WOTS+) private keys are generated using a secret seed value and an index value. The index value is updated for every hash-based signature such that only unique WOTS+ private keys are generated. To guarantee the security of the XMSS cryptosystem, a XMSS signer generating the XMSS signature must guarantee that the index value is never used more than once. This can be achieved using a secure monotone counter, which can be neither decreased nor reset. This is typically a very strong requirement which could be even circumvented in some cases, e.g. by modifying the counter during the signature computation after that the counter has been securely loaded from memory. There is no way for the XMSS verifier to check if the XMSS signer is behaving correctly.

FIG. 2 shows the hash-based signature HBsig. The hash-based signature HBsig is a data structure consisting of several segments 11, 12, 13, 14. Segment 11 comprises an index of the one-time key pair, segment 12 comprises a randomized message hashing. In segment 13 the one-time signature OTsig is comprised. Segment 14 comprises a so-called authentication path AP for the used one-time key pair providing the nodes of the Merkle Tree required to calculate a so called root, which is the hash-based public key HBpk for all hash-based digital signatures 10 generated by one of the one-time private keys OTsk of the stateful hash-based signature scheme, see FIG. 1.

The signing system and the signing method are based on the observation that one-time private keys OTsk are uniquely tied to their corresponding one-time public keys OTpk, one-time public keys OTpk are uniquely tied to one-time signatures OTsig, and one-time signatures OTsig are included within the hash-based signature HBsig. Since the one-time public keys OTpk can be computed out of one-time signatures OTsig, it is possible to indirectly verify if one-time secret keys OTsk were used multiple times by verifying if one-time public keys OTpk have been seen already.

FIG. 3 shows a signing system 20 comprising a signing device 21 having a stateful hash-base cryptographic function which is configured to output hash-based digital signatures HBsig generate by a stateful hash-based cryptographic function. The signing system 20 further comprises a logging device 22 and a verifying device 23. The logging device 22 can serve not only one signing device 21 but several independent signing devices. Each of the signing device 21, logging device 22 and a verifying device 23 comprises at least one processor which is configured to perform the described functions.

The signing device 21 is configured to receive data to be signed, see reference sign "dat" at FIG. 3. The signing device 21 generate a hash-based digital signature HBsig for the data dat based on a current one-time private key. The hash-based signature HBsig comprises a one-time signature as described before with FIG. 2. The signing device 21 generate a one-time public key OTpk based on the one-time signature and sends the generated one-time public key OTpk to the logging device 22, see second arrow in FIG. 3. Further, the signing device 21 sends the hash-based digital signature HBsig to the verifying device 23, see third arrow in FIG. 3. The signing device 21 can perform the sending tasks also in opposite temporal order, i.e first sends the hash-based digital signature HBsig to the verifying device 23 and then sends the generated one-time public key OTpk to the logging device 22. In this case the sending tasks should be performed without or only short delay between each other.

The verifying device 23 is configured to generate a validation one-time public key valOTpk based on the hash-based digital signature HBsig received from the signing device 21 and the data dat. E.g., the verifying device 23 determines the validation one-time public key valOTpk during verification of the received hash-based digital signature HBsig. The hash-based digital signature HBsig is verified by first computing a data digest using several parameters from the hash-based public key HBpk, which is known in the verifying device 23 and the data dat. Then the used one-time public key, i.e. the validation one-time public key valOTpk is computed from the hash-based signature HBsig. The validation one-time public key valOTpk in turn is used to compute the corresponding leaf L, see FIG. 1. The leaf L, together with the authentication path AP, is used to compute an alternative root value for the tree. The verification succeeds if and only if the computed root value matches the one in the hash-base public key HBpk. In any other case it must return fail.

The verifying device 23 sends the determined valOTpk to the logging device 22 to validate whether the one-time private key OTsk used to generate the hash-based signature HBsig was used only once by the signing device 21, see arrow 4 in FIG. 3. The logging device 22 compares validation one-time public keys valOTpk because for each Merkle tree root there can be between thousands and millions of one-time public keys therefore it would not be possible to detect a misuse by only comparing Merkle trees' roots.

The logging device 22 is configured to store the generated one-time public key OTpk received from the signing device 21. It is further configured to receive a validation one-time public key valOTpk from the verifying device 23 and to compare the validation one-time public key valOTpk with all one-time public keys stored in the logging device 22. If the validation one-time public key valOTpk coincides with exactly one stored one-time private key, the logging device 22 provides a validation feedback signal to the verifying device 23. If the validation one-time public key valOTkey does not coincide with exactly one stored one-time private keys, it provides a warning feedback signal to the verifying device 23.

FIG. 4 shows a further embodiment of the signing system 30, comprising a signing device 31, a verifying device 33 and a logging device 32 comprising a separate logging unit 34 storing the one-time public key and an auditing unit 35 monitoring the stored one-time public keys in the logging unit 34. The logging unit 34 and the monitoring unit 35 can be implemented as physically separated entities. The monitoring unit 35 can even be implemented physically collocated in a verifying device. The configuration and processing of the signing device 31 and the verifying device 33 remains unchanged with respect to signing system 20.

In the signing system 30 the signing device 31 generates a stateful hash-based signature HBsig for an input data dat using the current one-time private key OTsk. The signing device 31 generates the one-time public key OTpk corresponding to the one-time private key OTsk and sends it to the public logging unit 34. Further, the signing device 31 sends the hash-based signature HBsig to the verifying device 33, e.g., an IoT device. The verifying device 31 asks the auditing unit 35 if the validation one-time public key valOTpk is present exactly once in the public log. If this is the case, then it proceeds verifying the hash-based signature HBsig, otherwise it raises an alarm. Optionally, the alarm is raised also by the auditing unit 35.

The functional split of the logging device into logging unit 34 and auditing unit 35 is explained in the following. The logging unit 34 is configured to receive the generated one-time public key OTpk from the signing device 31. The auditing unit 35 is configured to receive the validation one-time public key valOTpk from the verifying device 23 and to send the validation feedback signal or the warning feedback signal to the verifying device 33. The monitoring unit 35 monitors the logging unit 34 with respect to the stored one-time public keys OTpk. The monitoring can be continuously, e.g. the monitoring unit 35 can query the logging unit 35 periodically, in predefined time intervals or on request. E.g., on receiving the validation one-time public key valOTpk from the verifying device 33, the auditing unit 34 compares the validation one-time public key valOTpk with the stored one-time public keys OTpk in the logging unit 34 and provides the validation feedback signal or the warning feedback signal to the auditing unit 35.

Alternatively or additionally, after receipt of the generated one-time public key OTpk from the signing device 31 in the logging unit 34, the logging unit 34 compares the generated one-time public key OTpk with all one-time public keys previously stored in the logging unit 34, and provides the resulting validation feedback signal or the warning feedback signal to the auditing unit 35. Alternatively, after receipt of the generated one-time public key OTpk, the logging unit 34 sends an indication to the auditing unit 35, that a new one-time public key OTpk is stored, and the auditing unit retrieves the newly stored one-time public key OTpk from the logging unit 34. The logging unit 34 can also forwards the newly stored one-time public key OTpk to the auditing unit 35. Subsequently, the auditing unit 35 initiates the comparing of the newly stored one-time public key with those stored in the logging unit 35 and provides the resulting feedback signal, to answer a request for validation from the verifying unit 33.

The auditing unit 35 stores the validation one-time public key received from the verifying device 33 and automatically provides the warning feedback signal if a warning feedback signal is received for the validation one-time public key later. The auditing unit 35 can notify all verifying devices, which received a validation feedback signal, if a warning feedback signal is provided for any of the one-time public key stored in the logging device. The logging unit 35 may be publicly accessible.

In signing system 20, 30 the signing device 21, 31 can send the hash-based digital signature and the data to be signed to the logging device 22, 32, and the logging device 22, 32 generates the one-time public key based on the hash-based digital signature and the data. In a further embodiment the logging device 22, 32 stores additional meta-information related to the hash-based digital signature received from the signing device 21, 31 and/or the logging device 22, 32 stores additional meta-information related to the verifying device received with the validation one-time public key from the verifying device 23, 33. The logging device 22, 32 comprises more than one logging units 34 and/or more than one auditing units 35.

The signing system 20, 30 can comprise a large amount of verifying units 23, 33, especially all verifying units 23, 33 which receive hash-based signatures generated by the signing device 21, 31 of the signing system 20, 30.

In a variant of the embodiment, one or more auditing units 35 validate the hash-based signature HBsig on behalf of the verifying device 33. The advantage is that auditing units 35 can be organized in a hierarchical structure and information can be audited using only a subset of data that is relevant in the given context, e.g., geographical region.

In a variant of the embodiment, the logging unit is shared across multiple signing devices 31. The advantage is that a third party, that is independent from all the signing devices 31 that generate the log entries, can independently collect and verify the correct functioning of multiple signing devices 31. In a variant of the embodiment, all communications among the parties are further encrypted, and all parties involved are mutually authenticated. In a variant of the embodiment, multiple distributed logging devices 22, 32 or logging units (34) are used for redundancy and load-balancing.

FIG. 5 shows a logging device 40 comprising a data interface 41 to communicate with the signing device 21, 31 and a storage unit 42 configured to store the one-time public keys received from the signing device 21, 31. The data interface and storage unit build up the logging unit 34, described in FIG. 4. The logging device 40 further comprises a validation unit 43 and a verifier interface 44 building the auditing unit 35.

FIG. 6 shows a signing device 50 comprising a data interface 51 to communicate with the signing device 21, 31, a generating unit 52 comprising a hash-based cryptography function generating the hash-based signatures HBsig. The signing device 50 further comprises a verifier interface 53 to communicate with the verifying device 23, 33 as well as a logging interface 54 for communication to the logging device 22, 32.

FIG. 7 illustrates the method for validating stateful hash-based digital signatures as a flow chart. Method identifies a security breach of stateful hash-based digital signatures. The method comprises the steps receiving S1 data to be signed, generating S2 a hash-based digital signature comprising a one-time signature calculated for the data based on a one-time private key, generating S3 a one-time public key based on the one-time signature, sending S4 the generated one-time public key to a logging device 22, 32, and sending S5 the hash-based digital signature to a verifying device 23, 33, in the signing device 21, 31.

The method comprises in the verifying device 23, 33 the steps generating S6 a validation one-time public key based on the hash-based digital signature and the data and sending S7 the validation one-time public key to the logging device 22, 32.

The method comprises following the steps performed in the logging device 22, 32: storing S8 the generated one-time public key, receiving S9 the validation one-time public key, comparing S10 the validation one-time public key with all one-time public keys stored in the logging device 22, 32, and providing S11 a validation feedback signal to the verifying device 23, 33, if the validation one-time public key coincides with exactly one stored one-time private key, and providing S12 a warning feedback signal, if the validation one-time public key does not coincide with exactly one stored one-time private key to the verifying device 23, 33.

Embodiments of the invention can be applied not only to XSMM but also to other stateful hash-based signatures based on one-time signatures, like Winternitz One-Time Signature (WOTS), Winternitz One-Time Signature Plus (WOTS+), Leighton-Micali One-Time Signatures (LM-OTS), LOTS and Merkle trees. Embodiments of the invention can be applied to XMSS^MT, which is a multi-tree variant of XMSS which is also described in the RFC 8391 and NIST SP 800-28.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A signing system for validating stateful hash-based digital signatures, comprising at least one signing device, a logging device and a verifying device, wherein each signing device is configured to:
receive data to be signed,
generate a hash-based digital signature comprising a one-time signature calculated for the data based on a one-time private key,
generate a one-time public key based on the one-time signature,
send the generated one-time public key to the logging device,
send the hash-based digital signature to the verifying device;
the verifying device is configured to:
generate a validation one-time public key based on the hash-based digital signature and the data, and
send the validation one-time public key to the logging device; and
the logging device is configured to:
store the generated one-time public key,
receive a validation one-time public key,
compare the validation one-time public key with all one-time public keys stored in the logging device,
provide a validation feedback signal to the verifying device, if the validation one-time public key coincides with exactly one stored one-time private key, and
provide a warning feedback signal, if the validation one-time public key does not coincide with exactly one stored one-time private key to the verifying device.

2. The signing system according to claim 1, wherein the logging device comprises a logging unit storing the one-time public key and an auditing unit monitoring the stored one-time public keys in the logging unit.

3. The signing system according to claim 2, wherein the auditing unit receives the validation one-time public key from the verifying device and provides the validation feedback signal or the warning feedback signal to the verifying device.

4. The signing system according to claim 3, wherein the auditing unit notifies all verifying devices, which received the validation feedback signal, if the warning feedback signal is provided for any of the one-time public key stored in the logging device.

5. The signing system according to claim 3, wherein the auditing unit passes the validation one-time public key received from the verifying device to the logging unit and passes the validation or warning feedback signal received from the logging unit to the verifying device.

6. The signing system according to claim 2, wherein on receiving the generated one-time public key from the signing device in the logging unit, the logging unit or the auditing unit compares the generated one-time public key with all one-time public keys previously stored in the logging unit, and provides the validation feedback signal or the warning feedback signal to the auditing unit.

7. The signing system according to claim 2, wherein on receiving the validation one-time public key from the verifying device, the auditing unit compares the validation one-time public key with the stored one-time public keys and provides the validation feedback signal or the warning feedback signal to the auditing unit.

8. The signing system according to claim 2, wherein the auditing unit stores the validation one-time public key received from the verifying device and automatically provides the warning feedback signal if a warning feedback signal is received for the validation one-time public key at a later time.

9. The signing system according to claim 1, wherein the signing device sends the hash-based digital signature and the data to be signed to the logging device, and the logging device generates the one-time public key based on the hash-based digital signature and the data.

10. The signing system according to claim 1, wherein the logging device stores additional meta-information related to the hash-based digital signature received from the signing device and/or the logging device stores additional meta-information related to the verifying device received with the validation one-time public key from the verifying device.

11. The signing system according to claim 1, wherein the logging device comprises more than one logging unit and/or more than one auditing unit.

12. A signing device for improved validation using stateful hash-based digital signatures, the signing device comprising at least one processor configured to:
receive data to be signed,
generate a hash-based digital signature comprising a one-time signature calculated for the data based on a one-time private key,
generate a one-time public key based on the one-time signature,
send the generated one-time public key to a logging device,
send the hash-based digital signature to a verifying device.

13. A method for validating stateful hash-based digital signatures, comprising:
in a signing device
receiving data to be signed,
generating a hash-based digital signature comprising a one-time signature calculated for the data based on a one-time private key,
generating a one-time public key based on the one-time signature,
sending the generated one-time public key to a logging device,
sending the hash-based digital signature to a verifying device, and
in the verifying device
generating a validation one-time public key based on the hash-based digital signature and the data,
sending the validation one-time public key to the logging device,
in the logging device
storing the generated one-time public key,
receiving the validation one-time public key,
comparing the validation one-time public key with all one-time public keys stored in the logging device,
providing a validation feedback signal to the verifying device, if the validation one-time public key coincides with exactly one stored one-time private key, and
providing a warning feedback signal, if the validation one-time public key does not coincide with exactly one stored one-time private key to the verifying device.

14. A computer program product, comprising a computer readable hardware storage device having computer readable program code stored therein, said program code executable by a processor of a computer system to implement the method of claim 13.

* * * * *